(12) United States Patent
Berezin (10) Patent No.: US 6,603,513 B1
(45) Date of Patent: Aug. 5, 2003

(54) USING A SINGLE CONTROL LINE TO PROVIDE SELECT AND RESET SIGNALS TO IMAGE SENSORS IN TWO ROWS OF A DIGITAL IMAGING DEVICE

(75) Inventor: Vladimir Berezin, La Crescenta, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/250,623

(22) Filed: Feb. 16, 1999

(51) Int. Cl.[7] .............................................. H04N 5/335
(52) U.S. Cl. ...................... 348/308; 250/208.1; 348/302
(58) Field of Search ................................. 348/294, 295, 348/296, 297, 302, 303, 308; 250/208.1; H04N 5/335

(56) References Cited

U.S. PATENT DOCUMENTS

| | | |
|---|---|---|
| 5,572,257 A | 11/1996 | Conrads et al. |
| 5,734,191 A | 3/1998 | Chi et al. |
| 5,763,909 A | 6/1998 | Mead et al. |
| 5,831,258 A | 11/1998 | Street |
| 6,300,978 B1 * | 10/2001 | Matsunaga et al. ......... 348/308 |
| 6,365,950 B1 * | 4/2002 | Sohn ......................... 257/431 |
| 6,410,899 B1 * | 6/2002 | Merrill et al. ........... 250/208.1 |

* cited by examiner

Primary Examiner—Tuan Ho
(74) Attorney, Agent, or Firm—Dickstein Shapiro Morin & Oshinsky, LLP (57) ABSTRACT

A digital imaging system, such as an active pixel sensor (APS) system, includes an array of sensors arranged into lines that form rows and columns. Each sensor in the array includes a photosensor that collects electric charge when exposed to light. Each sensor also includes a select circuit that generates an output signal indicating the amount of charge collected by the photosensor during a given time, and a reset circuit that clears collected charge from the sensor at a selected time. The APS system also includes a line decoder circuit that produces select and reset signals and delivers the signals to the select circuits over control lines. Each control line connects to two adjacent lines, e.g., rows or columns, of the array, delivering a select signal to the image sensors in one of the two lines and delivering a reset signal to the image sensors in the other line.

51 Claims, 7 Drawing Sheets

USING A SINGLE CONTROL LINE TO PROVIDE SELECT AND RESET SIGNALS TO IMAGE SENSORS IN TWO ROWS OF A DIGITAL IMAGING DEVICE

CROSS REFERENCE TO RELATED APPLICATIONS

This application claims the benefit of U.S. Provisional Application No. 60/075,454, filed on Feb. 20, 1998, the full disclosure of which is incorporated by reference.

TECHNOLOGICAL FIELD

The invention relates to digital imaging devices, such as active pixel sensor and CCD arrays.

BACKGROUND

Digital imaging devices such as active pixel sensor (APS) and charge-coupled device (CCD) cameras include many image sensors arranged into arrays of columns and rows. Each image sensor collects electrical charge when exposed to light. Control signals provided to the image sensors periodically enable the sensors to transfer the collected charge, or voltage-mode signals derived from the charge, to an imaging circuit.

SUMMARY

The inventor has recognized a desire to reduce a necessary number of control lines for a given application that drive the image sensors in a digital imaging array. One technique for reducing the number of control lines is to provide multiple control signals on lines that are shared by adjacent rows of sensors in the array. Many advantages result, including greater space resolution in the sensor array, reduced interlevel (e.g., metal to polysilicon) contacts in the APS circuit, and higher quantum efficiency for the sensors.

In one aspect, the invention features a digital imaging device that includes a plurality of image sensors arranged into an array of lines including rows and columns. At least one output line connects to the image sensors. A control line connects electrically to at least two different image sensors in two different lines. The control line delivers a select signal to at least one image sensor in one of the lines and delivers a reset signal to at least one image sensor the other line. The select signal causes the image sensor in the first line to place an output signal on the output line, and the reset signal clears information from the image sensor in the second line.

In another aspect, the invention features a digital imaging system that includes a plurality of image sensors arranged into an array of lines forming rows and columns. Each of the image sensors includes a photosensor that collects electric charge when exposed to light, a select circuit that generates an output signal indicating the amount of electric charge collected by the photosensor, and a reset circuit that removes collected charge from the photosensor. The system also includes a line decoder circuit. This circuit includes a plurality of control lines and a control circuit that delivers select signals and reset signals over the control lines. Each control line connects to image sensors in two lines of the array. Each control line delivers a select signal to the select circuits in one of the two lines and delivers a reset signal to the reset circuits in the other of the two lines.

In another aspect, the invention features a method for use in capturing an image with a plurality of image sensors arranged into an array of lines forming rows and columns. A select signal is delivered to at least one image sensor in a first one of the lines, and a reset signal is delivered to at least one image sensor in a second one of the lines. The select signal and the reset signal are delivered over a single control line. In response to the select signal, an output signal is delivered from the image sensor in the first line, and information is cleared from the image sensor in the second line.

Other embodiments and advantages are apparent from the following description and from the claims.

DETAILED DESCRIPTION

Figure 1:
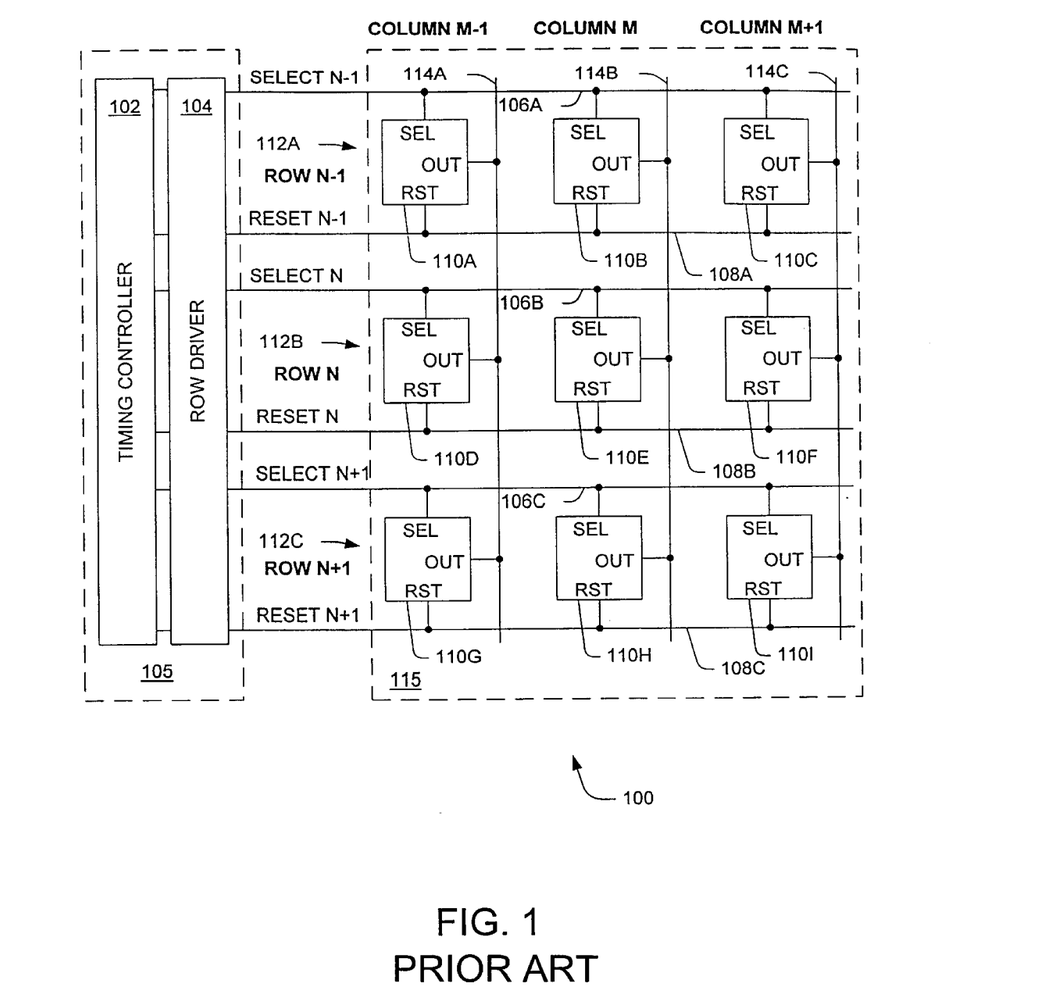
FIG. 1 is a schematic diagram of a conventional active pixel sensor (APS) circuit.

A conventional APS circuit 100 is shown in FIG. 1. In this circuit 100, a timing controller 102 and a row driver 104 together form a control circuit 105 that generates two types of control signals, known as select signals and reset signals, which control the readout of collected charge from each sensor 110A-I in the APS array 115. The control circuit 105 provides two control lines, a select line 106A-C and a reset line 108A-C, for each row 112A-C of sensors in the array 115. Each sensor 110A-I converts the collected charge into a signal and delivers this signal to one of several column lines 114A-C when the corresponding select line 106A-C is asserted. All collected charge is cleared from the sensor when the corresponding reset line 108A-C is asserted.

Figure 2:
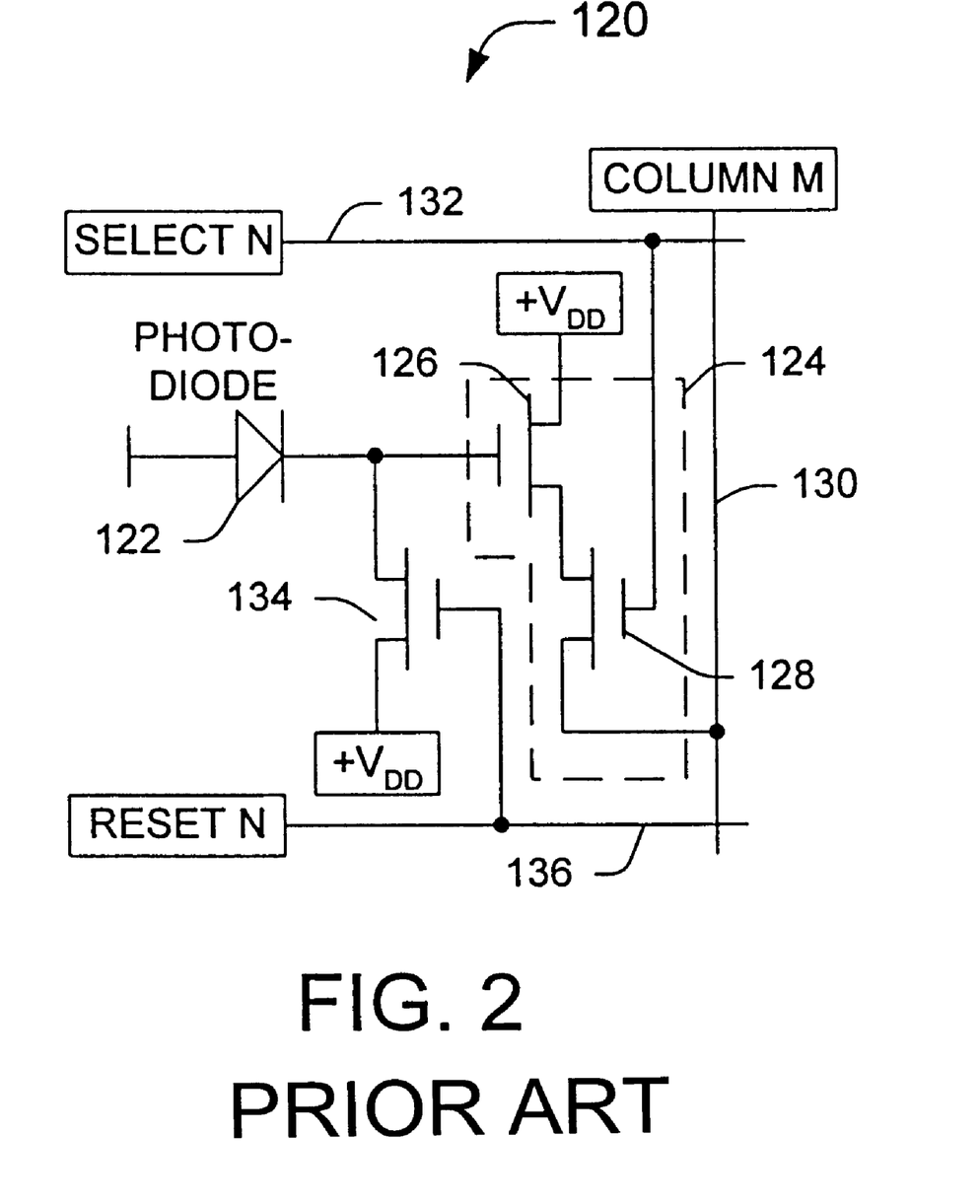
FIGS. 2 and 4 are schematic diagrams of two types of conventional active pixel sensors.

FIG. 2 shows a typical active pixel sensor 120. The sensor 120 includes a photosensitive element, e.g., photodiode 122 that collects charge when exposed to light. The charge is delivered at selected times to an output driver 124. The output driver 124 includes two transistors 126, 128 that deliver an output signal to the corresponding column line 130. One of these transistors is a source-follower transistor 126, the source of which connects to a power supply line (Vdd), and the gate of which connects to the cathode of the photodiode 122. The other transistor is a switching transistor 128 that connects the drain of the source-follower transistor 126 to one of the column lines 130. The gate of the switching transistor 128 connects to one of the select lines 132 extending from the control circuit 105.

The sensor 120 also includes a reset transistor 134 connected between the cathode of the photodiode 122 and the power supply line (Vdd). The gate of this transistor 134 connects to one of the reset lines 136 extending from the control circuit.

In operation, charge collected in the photodiode 122 diffuses into the gate of the source-follower transistor 126 and creates an output voltage on the column line 130 when the switching transistor 128 is activated by the select line. The reset transistor 134 begins conducting and thus clears collected charge from the photodiode 122 when the reset line 136 is asserted.

Figure 3:
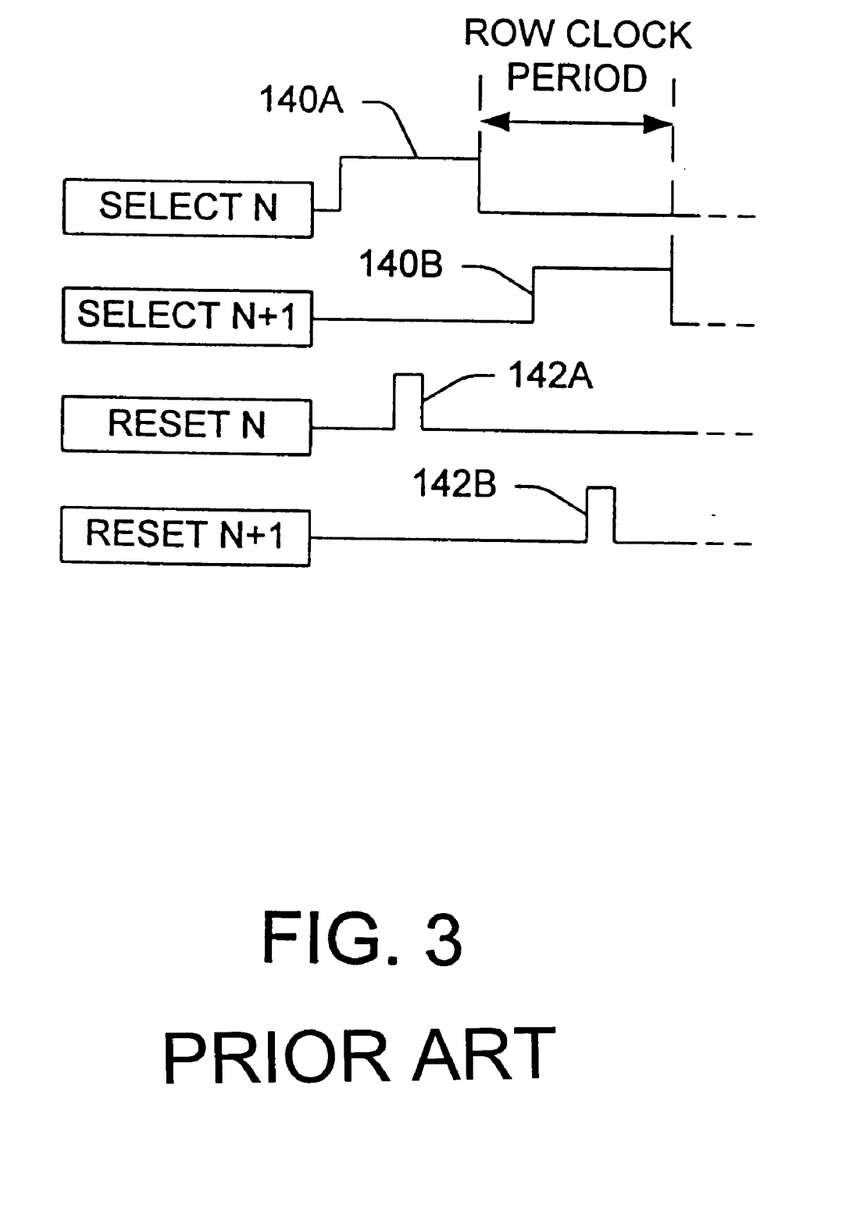
FIGS. 3 and 5 are timing diagrams for control signals delivered to the active pixel sensors of FIGS. 2 and 4.

FIG. 3 shows the relative timing of the select and reset signals for two adjacent rows of sensors in the APS array. Each row of sensors has a corresponding select line, which delivers a select pulse 140A-B to each sensor in the row. Each row also has a corresponding reset line, which delivers a reset pulse 142A-B to each sensor in the row during the corresponding select pulse 140A-B. Charge that collects in the photodiode 122 during the portion of the select pulse 140A-B that follows the reset pulse 142A-B is treated as background noise. The charge that collects in the photodiode during the portion of the select pulse 140A-B that precedes the reset pulse 142A-B is attributable both to background noise and to the incoming image. The difference between the output signals generated during these two time periods indicates how much of the collected charge is attributable to the incoming image. The time interval between the rising or falling edge of the select signal 140A on one select line and the corresponding rising or falling edge of the select signal 140B on an adjacent select line is known as the "row clock period."

Figure 4:
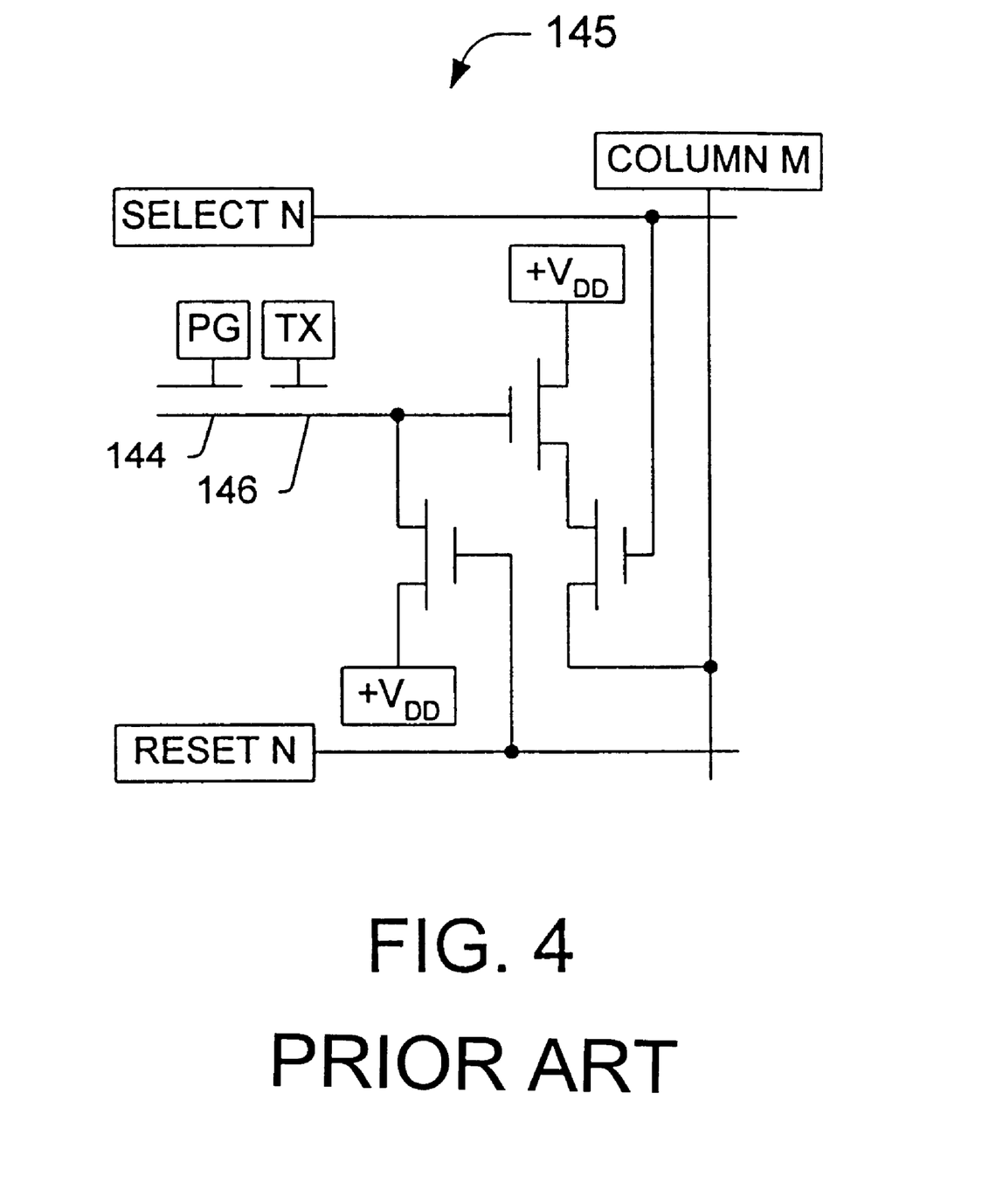
Figure 5:
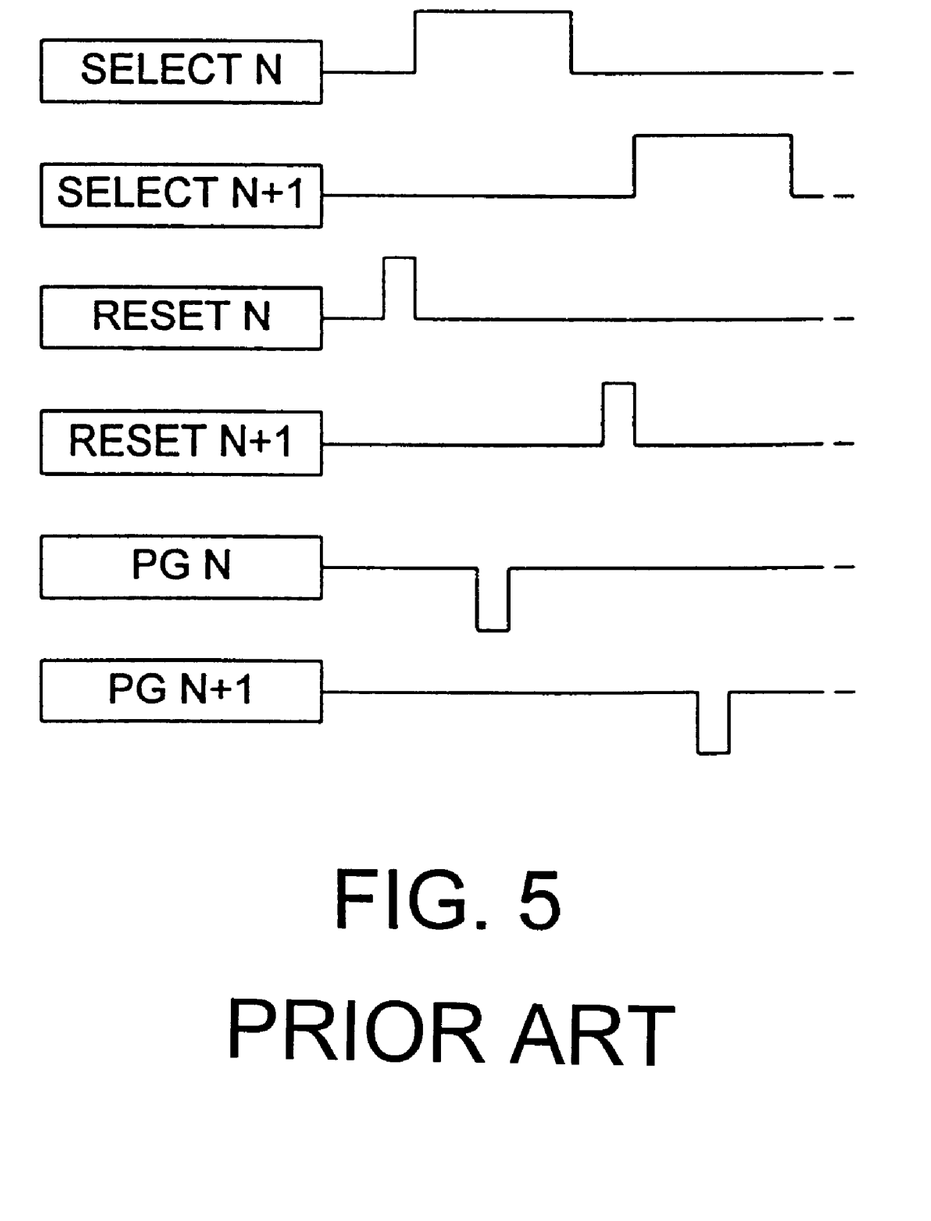

FIG. 4 shows another typical APS sensor 145, which acts essentially as a single-stage charge-coupled device (CCD). In this sensor 145, a photogate 144 and a charge transfer gate 146 replace the photodiode of FIG. 2. Four control signals, including a select signal, a reset signal, a photogate (PG) signal, and a charge transfer (TX) signal, are provided for each row of sensors in the array. FIG. 5 shows the relative timing of the select, reset, and PG signals for two adjacent rows of sensors.

Figure 6:
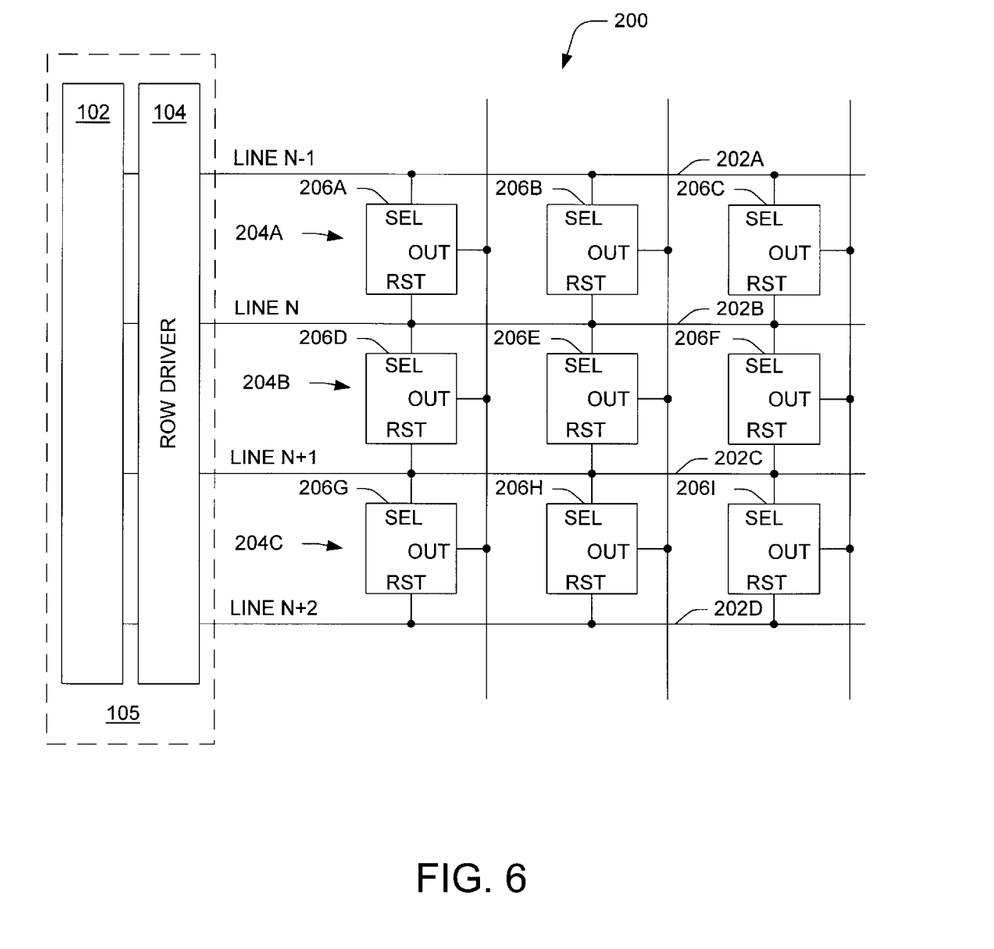
FIG. 6 is a schematic diagram of an APS circuit in which a single control line is shared by two adjacent rows of sensors in the array.

FIG. 6 shows an APS circuit 200 in which the number of control lines is reduced by almost a factor of two over conventional APS circuits. Instead of providing separate select and reset lines for each row of sensors, the APS circuit 200 includes control lines 202A, 202B, 202C, respectively associated with each row of sensors. One additional control line 202B is also needed.

The sensors are arranged in an array formed by lines including rows and columns 204A, 204B, 204C. Each control line 202B, 202C that is connected between two sensor rows 204B, 204C is shared by all of the sensors on those two adjoining rows. In particular, a shared control line 202B delivers a select signal to sensors in one row 204B and delivers a reset signal to sensors in another row 204A.

Figure 7:
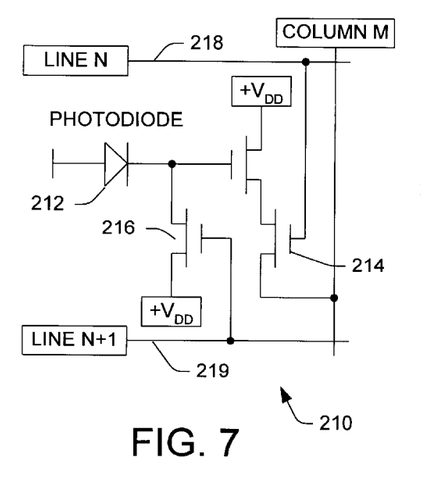
FIGS. 7 and 9 are schematic diagrams of two types of active pixel sensors for use in APS circuits like that of FIG. 6.
Figure 9:
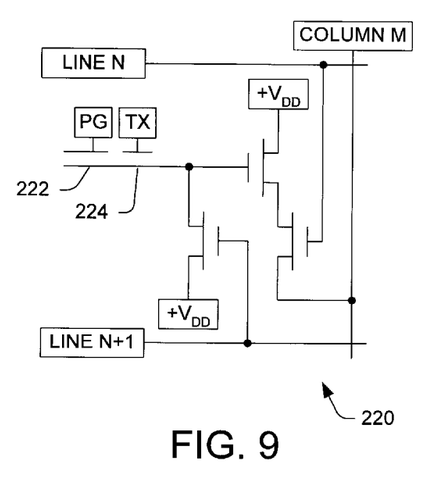

FIGS. 7 and 9 show alternative image sensors 210, 220 for use in the shared-line APS array 200. A photodiode 212 serves as the image sensing device in one of these sensors 210. A single-stage CCD, embodied as a photogate 222 and a charge transfer transistor 224, serves as the image sensing device in the other sensor 220. The reset circuit structures for these sensors 210, 220 are similar to those for the conventional sensors of FIGS. 2 and 4. However, the switching transistor 214 and the reset transistor 216 do not connect to a separate dedicated select line and a dedicated reset line, as shown in FIGS. 2 and 4. Rather, these transistors 214, 216 connect to shared control lines 218, 219. Each of these delivers both select signals and reset signals to sensors in two rows of the APS array. The single-stage CCD sensor 220 (FIG. 9) also receives a photogate signal (PG) and a charge transfer signal (TX) like those described above.

Figure 8:
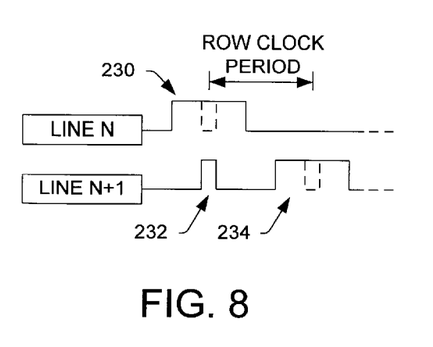
FIGS. 8 and 10 are timing diagrams for control signals delivered to the active pixel sensors of FIGS. 7 and 9.

FIG. 8 shows the relative timing of the control signals on the shared control lines 218, 219 for the sensor 210 of FIG. 7. The upper control line 218 provides one or more select pulses 230 to the switching transistor 214. During the select pulse 230, the lower control line 219 delivers a reset pulse 232 to the reset transistor 216. The collected charge is cleared from the photodiode 212 during the reset pulse 232. The lower control line 219 later provides a select pulse 234 that activates the sensors in another row of the array. The centers of the reset pulse 232 and the select pulse 234 on each shared control line 219 are separated by a time interval that is equal to approximately one row clock period. In some implementations, the select pulse 230 on one control line 218 is deasserted during the corresponding reset pulse 232 on an adjacent control line 219, as shown by the dashed lines in FIG. 8.

Figure 10:
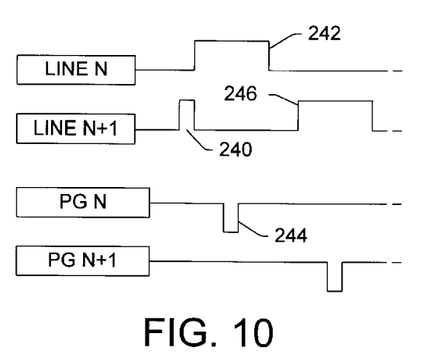

FIG. 10 shows the relative timing of the photogate signal PG and the control signals provided on the shared control lines 218, 219 for the sensor 220 of FIG. 9. The lower control line 219 delivers a reset pulse 242 to the reset transistor, and then the upper control line 218 delivers one or more select pulses 242 to the switching transistor. During the select pulse 242, a photogate pulse 244 is delivered to the photogate 222, during which the photogate 222 transfers charge to the output driver. The lower control line 219 later delivers one or more select pulses 246 to the sensors in another row of the array.

Figure 11:
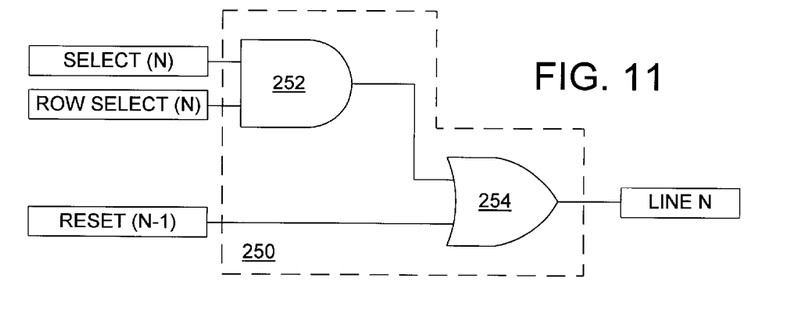
FIG. 11 is a schematic diagram of a logic circuit that drives a shared control line.

FIG. 11 shows a logic circuit 250 that is used to generate control signals on a shared control line (LINE N). This circuit 250 is added to the conventional control circuit 105 of FIG. 1 to replace a pair of select and reset lines with a single shared control line. The logic circuit 250 receives standard select pulse and row select signals for a particular row N [SELECT(N), ROW_SELECT(N)] from a conventional row driver. The circuit 250 also receives a standard reset pulse for an adjacent row N–1 [RESET_(N–1)]. An AND gate 252 receives the SELECT(N) and ROW_SELECT(N) signals as input, and an OR gate 254 receives the RESET(N–1) signal and the output of the AND gate 252 as input. The output of the OR gate drives a control line (LINE N) that is shared by the sensors in row N and row N–1 of the array. The control line is asserted when both the ROW_SELECT(N) and the SELECT(N) signals are asserted and when the RESET(N–1) signal is asserted.

Other embodiments are within the scope of the following claims. For example, while the invention has been described in terms of an APS array, the invention is useful in other pixel based imaging systems. The invention also is not limited to the use of gated transistors, such as field effect transistors (FETs). Other switching devices, including other types of transistors, such as bipolar junction transistors, are used in some implementations. Also, while this system is described as being used for one control for two rows, it should be understood that the control could be shared between columns instead.

What is claimed is:

1. A digital imaging device comprising:
   a plurality of image sensors arranged into an array of lines including rows and columns;
   at least one output line connected to the image sensors; and
   a control line connected electrically to at least two different image sensors in two different lines and configured to deliver a select signal to at least one image sensor in a first one of the lines and to deliver a reset signal to at least one image sensor in a second one of the lines, where the select signal causes the image sensor in the first line to place an output signal on the output line, and where the reset signal clears information from the image sensor in the second line.

2. The digital image device of claim 1, wherein the lines to which the control line connects are rows.

3. The digital image device of claim 1, wherein the lines to which the control line connects are columns.

4. The digital imaging device of claim 1, wherein the image sensor includes a photosensor.

5. The digital imaging device of claim 4, wherein the image sensor in the first line includes a select switch connected. between the photosensor and the control line and configured to conduct when the select signal is received.

6. The digital imaging device of claim 5, wherein the select switch includes a transistor.

7. The digital imaging device of claim 4, wherein the image sensor in the second line includes a reset switch connected between the photosensor and the control line and configured to conduct when the reset signal is received.

8. The digital imaging device of claim 7, wherein the reset switch includes a transistor.

9. The digital imaging device of claim 1, further comprising a control circuit connected to the control line and configured to produce the reset signal and the select signal.

10. The digital imaging device of claim 9, wherein the control circuit is configured to produce the reset signal before producing the select signal.

11. The digital imaging device of claim 9, wherein the control circuit is configured to produce the reset signal and the select signal separated by a time increment approximately equal to a row clock period of the imaging device.

12. The digital imaging device of claim 4, wherein said photosensor is a photodiode.

13. The digital imaging device of claim 4, wherein said photosensor is a photogate.

14. A digital imaging system comprising:
a plurality of image sensors arranged into an array of lines including rows and columns, each image sensor including:
a photosensor configured to collect electric charge when exposed to light;
a select circuit coupled to the photosensor to generate an output signal indicating an amount of electric charge collected by the photosensor; and
a reset circuit coupled to the photosensor to remove collected charge from the photosensor; and a line decoder circuit including:
a control circuit configured to produce select signals and reset signals; and
a plurality of control lines, each of which is connected to image sensors in two of the lines, and each of which is configured to deliver one of the select signals to the select circuits of image sensors in one of the two lines and to deliver one of the reset signals to the reset circuits of image sensors in the other of the two lines.

15. The digital imaging system of claim 14, wherein the control circuit is configured to generate the reset signal for each control line before generating the select signal for the control line.

16. The digital imaging system of claim 14, wherein the select circuit in each image sensor includes a source-follower transistor coupled to a switching transistor.

17. The digital imaging system of claim 16, wherein the gates of each of the switching transistors in one of the rows are driven by a select signal delivered by one of the control lines.

18. The digital imaging system of claim 16, wherein the source-follower transistor is configured to convert electric. charge collected by the photosensor into an output voltage.

19. The digital imaging system of claim 14, wherein the reset circuit in each image sensor includes a switching transistor.

20. The digital imaging system of claim 19, wherein the gates of each of the switching transistors in one of the lines are driven by a reset signal delivered by one of the control lines.

21. The digital imaging system of claim 14, wherein the lines to which each control line connects are rows.

22. The digital imaging system of claim 14, wherein the lines to which each control line connects are columns.

23. A method for use in capturing an image with a plurality of image sensors arranged into an array of lines including rows and columns, the method comprising:
delivering a select signal to at least one image sensor in a first one of the lines and a reset signal to at least one image sensor in a second one of the lines over a single control line;
delivering an output signal from the image sensor in the first one of the lines in response to the select signal; and
clearing information from the image sensor in the second one of the lines in response to the reset signal.

24. The method of claim 23, wherein delivering the output signal from the image sensor in the first line includes delivering the select signal to a select switch in the image sensor and causing the select switch to conduct.

25. The method of claim 23, wherein clearing information from the image sensor in the second line includes delivering the reset signal to a reset switch in the image sensor and causing the reset switch to conduct.

26. The method of claim 23, further comprising delivering the reset signal over the control line before delivering the select signal.

27. The method of claim 23, further comprising delivering the reset signal and the select signal separated by a time increment approximately equal to a row clock period of the array of image sensors.

28. The method of claim 23, wherein the lines to which the control line connects are rows.

29. The method of claim 23, wherein the lines to which the control line connects are columns.

30. An integrated circuit comprising:
a first plurality of pixel cells disposed in a first row, said first plurality of pixel cells having a respective first plurality of reset inputs;
a second plurality of pixel cells disposed in a second row, said second plurality of pixel cells having a respective second plurality of select inputs, said second row disposed in spaced relation to said first row; and
a signal line mutually coupled to said first plurality of reset inputs and said second plurality of select inputs.

31. An integrated circuit as defined in claim 30 wherein said signal line is disposed in spaced relation between said first and second rows.

32. An integrated circuit as defined in claim 30 wherein said signal line is adapted to couple a signal transition to said first plurality of reset inputs and said second plurality of select inputs substantially simultaneously.

33. An integrated circuit as defined in claim 32 further comprising a row driver coupled to said signal line and adapted to generate said signal transition on said signal line.

34. An integrated circuit device as defined in claim 30 wherein said pixel cells are active pixel sensor cells.

35. An integrated circuit device as defined in claim 30 wherein said first and second pluralities of pixel cells comprise first and second pluralities of charge coupled device cells.

36. A method of operating an optical sensor having first, second and third pixel circuits comprising:

receiving a first signal at a first reset input of said first pixel circuit and at a second select input of said second pixel circuit substantially simultaneously during a first time interval, said first signal being received over a first common signal line;

receiving a second signal at a third reset input of said second pixel circuit and at a fourth select input of said third pixel circuit substantially simultaneously during a second time interval, said second signal being received over a second common signal line;

resetting said first pixel circuit and selecting said second pixel circuit substantially simultaneously during said first time interval; and resetting said second pixel circuit and selecting said third pixel circuit substantially simultaneously during said second time interval.

37. A method of operating an imager array comprising:

receiving a signal at a first plurality of inputs of a respective first plurality of sensor cells;

receiving said signal at a second plurality of inputs of a respective second plurality of sensor cells, said signal received at said first and second pluralities of inputs substantially simultaneously over a common signal line;

resetting said first plurality of sensor cells responsive to said signal; and selecting said second plurality of sensor cells responsive to said signal.

38. A method of operating an imager array as defined in claim 37 where each said sensor cell is a charge coupled device cell.

39. A method of operating an imager array as defined in claim 37 where each said sensor cell is a active pixel sensor cell.

40. A method of operating an active pixel sensor array as defined in claim 37 wherein said signal comprises a signal transition from a first logic state to a second logic state.

41. A method of forming an imager array comprising:

forming a first row of cells including a first plurality of sensors over a semiconductor substrate;

forming a second row of cells including a second plurality of sensors over said semiconductor substrate, said first and second rows of cells disposed in spaced relation to one another;

forming a signal line over said semiconductor substrate and disposed in spaced relation to said first and second rows of cells;

coupling said signal line to a first plurality of reset inputs and a second plurality of select inputs of said first and second rows of cells respectively;

forming a diver circuit over said semiconductor substrate; and coupling said signal line to an output of said driver circuit.

42. A method of forming an imager array as defined in claim 41 further comprising:

forming a row decoder circuit over said semiconductor substrate; and coupling an output of said row decoder circuit to an input of said driver circuit.

43. A method of forming an imager array as defined in claim 41 wherein each said sensor cell is a charge coupled device sensor cell.

44. A method of forming an imager array as defined in claim 41 where each said sensor cell is an active pixel sensor cell.

45. An imager array comprising:

means for generating a control signal; and single conductor means for conveying said control signal to a first plurality of image sensor cells and a second plurality of image sensor cells, said signal adapted to resetting said first plurality of image sensor cells and to selecting said second plurality of image sensor cells, said resetting and selecting occurring substantially simultaneously.

46. A method of forming an imager array as defined in claim 45 wherein each said image sensor cell is a charge coupled device sensor cell.

47. A method of forming an imager array as defined in claim 45 wherein each said image sensor cell is an active pixel sensor sensor cell.

48. An optical sensor device comprising:

first and second optical sensing circuits having respective select and reset inputs;

a signal line mutually coupled to said select input of said first optical sensing circuit and said reset input of said second optical sensing circuit;

a logic circuit having an output coupled to said signal line, a first logic input adapted to receive a select signal for said first optical sensing circuit, a second logic input adapted to receive a row-select signal for said first optical sensing circuit, and a third logic input adapted to receive a reset signal for said second optical sensing circuit, said logic circuit adapted to produce an output signal on said signal line in response to either a reset signal received at said third logic input or a select signal and a row select signal received concurrently at said first and second logic inputs respectively.

49. An optical sensor device as defined in claim 48 wherein said logic circuit comprises:

an AND gate having a first gate-input coupled to said first logic input and a second gate-input coupled to said second logic input; and an OR gate having a third gate-input coupled to an output of said AND gate and a fourth gate-input coupled to said third logic input.

50. An optical sensor device as defined in claim 49 wherein said first and second optical sensing circuits are active pixel sensor cells.

51. An optical sensor device as defined in claim 49 wherein said first and second optical sensing circuits are charge coupled devices.

* * * * *

UNITED STATES PATENT AND TRADEMARK OFFICE
CERTIFICATE OF CORRECTION

PATENT NO. : 6,603,513 B1
DATED : August 5, 2003
INVENTOR(S) : Vladimir Berezin

It is certified that error appears in the above-identified patent and that said Letters Patent is hereby corrected as shown below:

Column 7,
Line 55, "diver" should read -- driver --.

Signed and Sealed this

Twenty-eighth Day of October, 2003

JAMES E. ROGAN
*Director of the United States Patent and Trademark Office*